(No Model.)
J. M. SHARTLE.
LUBRICATOR.
No. 558,528.  Patented Apr. 21, 1896.
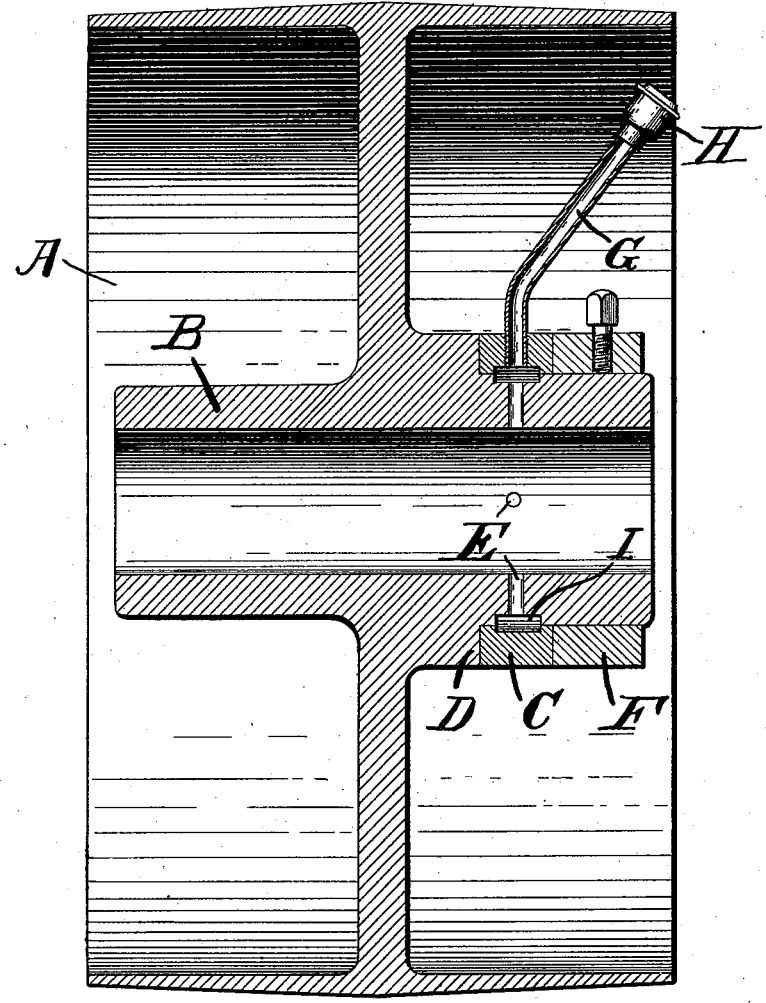
Witnesses:
E. R. Shipley.
M. S. Belden.
John M. Shartle
Inventor
by James W. See
Attorney

UNITED STATES PATENT OFFICE.

JOHN M. SHARTLE, OF MIDDLETOWN, OHIO.

LUBRICATOR.

SPECIFICATION forming part of Letters Patent No. 558,528, dated April 21, 1896.

Application filed February 28, 1896. Serial No. 581,115. (No model.)

*To all whom it may concern:*

Be it known that I, JOHN M. SHARTLE, of Middletown, Butler county, Ohio, have invented certain new and useful Improvements in Lubricators, of which the following is a specification.

This invention pertains to lubricators for loose pulleys, gears, clutches, and similar machine parts running loose upon a shaft and requiring to be lubricated.

My invention will be readily understood from the following description, taken in connection with the accompanying drawing, which is a vertical diametrical section of a loose pulley embodying my improvement.

In the drawing, A indicates a loose pulley, which may of course find its equivalent, so far as my improved lubricator is concerned, in a loose gear or part of a clutch, or similar machine part to turn on a shaft; B, the hub of the pulley, bored to fit the shaft on which the pulley is to turn, a portion of the exterior of this hub being truly turned to form a cylindrical journal; C, a collar fitting upon the turned exterior portion of the hub with sufficient looseness to permit the collar to turn upon the hub; D, a shoulder on the exterior of the hub, the inner face of collar C bearing against this shoulder; E, one or more radial oil-holes in the hub of the pulley in about the vertical plane of the center of collar C; F, a separable collar adjustably secured upon the hub of the pulley and bearing against the exterior face of collar C, collar F being firmly secured, in the exemplification, by means of a set-screw; G, an oil-tube with its inner end secured in collar C and leading to the interior of the collar, this tube projecting outwardly to a position near the exterior of the pulley; H, an oil-cup or removably capped funnel upon the outer end of the oil-tube, and I an annular recess formed in the joint between the inner cylindrical surface of collar C and the hub-surface on which it bears, this recess being formed either by boring an annular groove in the interior of the collar or by turning a groove in the exterior of the pulley-hub, or by grooving both the collar and the hub, as in the drawing.

Collar F is to be so adjusted as to give collar C a snug running fit between collar F and shoulder D. Under these conditions collar C and the oil-tube will turn with the pulley, but their turning may be at any time arrested by taking hold of the oil-tube. While all the parts are turning the oil-tube may be arrested while in its upper position and then the cap of oil-cup H may be unscrewed and oil poured into the oil-cup, this oil finding its way down into chamber I and through holes E to the bearing of the pulley upon the shaft. When the cap of the oil-cup is replaced and the oil-tube released, the oil-tube again takes up its turning motion with the pulley. By this means there is little side wear upon collar C, and consequently there is little tendency for it to become loose at its sides, so as to permit the oil to leak outwardly at the sides of the collar, it being obvious that collar C and the oil-tube will turn with the pulley except when temporarily restrained for the purpose of use in supplying oil.

I claim as my invention—

1. In a lubricator, the combination, substantially as set forth, of a hub having radial oil-holes and an exterior journal-surface, a collar fitting upon said exterior journal-surface and engaging between side bearing-surfaces carried by the hub, and an oil-tube projecting outwardly from said collar and communicating with the interior of the collar and having its outer end provided with a removable cap.

2. In a lubricator, the combination, substantially as set forth, of a hub provided with an exterior journal-surface having a shoulder and having oil-holes leading to the interior of the hub, a collar fitting on said exterior journal-surface and engaging against said shoulder and having its interior in free communication with said oil-holes, an oil-tube projecting outwardly from said collar and capped at its outer end, and a removable collar secured adjustably upon said hub and bearing against the outer face of the first-mentioned collar.

JOHN M. SHARTLE.

Witnesses:
B. HARWITZ,
W. G. CLARK.